UNITED STATES PATENT OFFICE.

MAX ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRAQUINONE VAT DYES AND PROCESS OF MAKING THEM.

1,032,215. Specification of Letters Patent. Patented July 9, 1912.

No Drawing. Application filed March 30, 1912. Serial No. 687,511.

*To all whom it may concern:*

Be it known that I, MAX ISLER, citizen of the Swiss Republic, residing at Mannheim, Germany, have invented new and useful Improvements in Anthraquinone Vat Dyes and Processes of Making Them, of which the following is a specification.

My invention consists in the manufacture and production of new vat dyes of the anthraquinone series by reacting on 1-halogen-anthraquinone or a derivative thereof, as hereinafter defined, with an anthraquinone compound which contains two mercapto groups in the positions 1 and 2.

My new dyes are regarded as containing two anthraquinone residues joined together by two sulfur atoms and the simplest member of them probably possesses a constitution corresponding to the formula

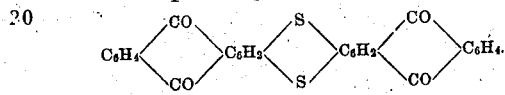

Identical, or similar, compounds can be obtained by employing, instead of 1-halogen-anthraquinone, the corresponding 1.2-dihalogen-anthraquinone or a derivative thereof which is substituted in position 2 by another group, such for instance as the methoxy or carboxyl or the aldehyde or the amino group, since in this case such group is split off and the sulfur atom of the dimercapto anthraquinone enters the said position 2.

My new compounds are characterized by being obtainable in the form of red crystals; they yield green to blue solutions in concentrated sulfuric acid and dye cotton, from a vat, red shades of excellent fastness.

The following example will serve to illustrate further the nature of my invention and how it can be carried into practical effect, but the invention is not confined to this example. The parts are by weight. Boil together, for from 2 to 3 hours, 30 parts of anthraquinone-1.2-dimercaptan (in the form of its di-sodium or di-potassium salt), 20 parts of 1.2-dichlor-anthraquinone and from 200 to 400 parts of nitrobenzene or of naphthalene. When the melt is cold, filter off the product and wash it with alcohol in order to free it from any nitrobenzene or naphthalene. The new product can be re-crystallized from nitrobenzene, the resulting glittering red crystals yielding a green-blue solution in concentrated sulfuric acid. The said crystals are insoluble in caustic soda solution, but are soluble in alkaline hydrosulfite, forming a vat which dyes cotton brick-red shades. In a similar manner, derivatives of either of the initial products can be employed for conversion into coloring matter.

Now what I claim is:—

1. The process of producing vat dyes of the anthraquinone series by reacting on a 1-halogen-anthraquinone body with an anthraquinone compound which contains two mercapto groups in the positions 1 and 2.

2. The process of producing a vat dye of the anthraquinone series by reacting on anthraquinone-1.2-dimercaptan with 1.2-dichlor-anthraquinone.

3. The new vat dyes of the anthraquinone series which can be obtained by reacting on a 1-halogen-anthraquinone body with an anthraquinone compound which contains two mercapto groups in the positions 1 and 2, which new vat dyes probably contain two anthraquinone residues joined together by two sulfur atoms and which can be obtained in the form of red crystals, which yield green to blue solutions in concentrated sulfuric acid and dye cotton from the vat red shades of excellent fastness.

4. The new vat dye of the anthraquinone series which can be obtained by reacting on anthraquinone-1.2-dimercaptan with 1.2-dichlor-anthraquinone and probably possesses a constitution corresponding to the formula

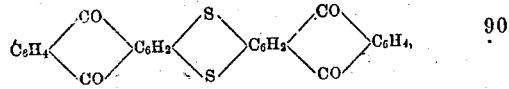

and which can be obtained in the form of red crystals, which yield a green-blue solution in concentrated sulfuric acid and dye cotton from the hydrosulfite vat brick red shades of excellent fastness.

In testimony whereof I have hereunto set my hand in the presence of two subscribing witnesses.

MAX ISLER.

Witnesses:
J. ALEC. LLOYD,
JOS. PFEIFFER.

Copies of this patent may be obtained for five cents each, by addressing the "Commissioner of Patents, Washington, D. C."